Figure 1:
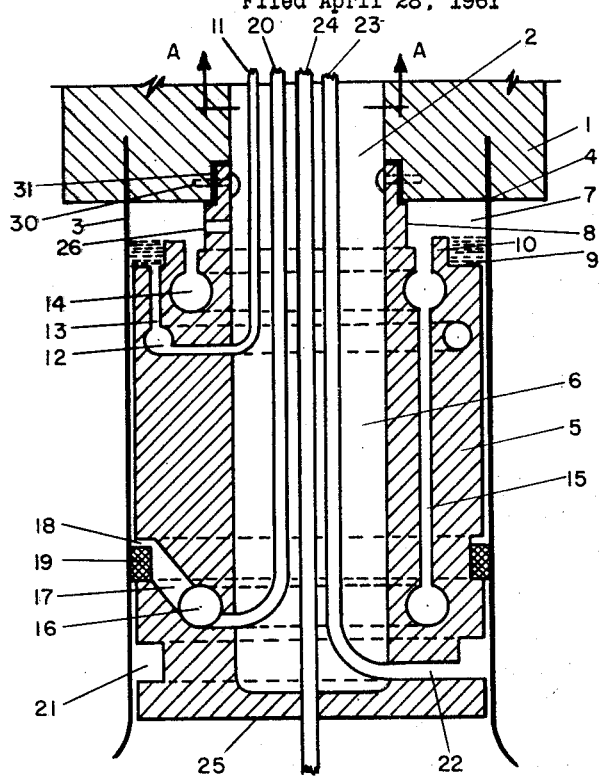

July 28, 1964 R. H. RALSTON 3,142,092
APPARATUS FOR SIMULTANEOUSLY EXTRUDING AND COOLING TUBULAR FILM
Filed April 28, 1961

ROBERT H. RALSTON
INVENTOR.

BY Ernest G. Peterson

United States Patent Office 3,142,092
Patented July 28, 1964

3,142,092
APPARATUS FOR SIMULTANEOUSLY EXTRUDING AND COOLING TUBULAR FILM
Robert H. Ralston, Kennett Square, Pa., assignor to Hercules Powder Company, Wilmington, Del., a corporation of Delaware
Filed Apr. 28, 1961, Ser. No. 106,230
3 Claims. (Cl. 18—14)

The present invention relates to apparatus for extruding molten polymers in the form of a tubular film and for cooling the film as it is extruded.

Numerous processes are known for making film from organic, thermoplastic polymers in which a film of the molten polymer is extruded in the form of a tube and the tube is then expanded by internal gas pressure to induce orientation of the polymer molecules. In the case of certain polymers it is necessary to cool the film before expanding it and thus cooling of the film is an intermediate step in the process. An illustration of such processes can be found in U.S. 2,862,234 to Gerber.

Various types of apparatus have been proposed for cooling the extruded film in the above process. The majority of such apparatus cool the film externally, for example, by spraying or otherwise contacting the outer surface of the tube with a cooling liquid. One such apparatus is described in U.S. 2,863,172 to Buteux et al. and comprises means defining a passageway for the tube combined with means for establishing a flow of cooling liquid between the external surface of the tube and the walls of the passageway.

Cooling apparatus such as has been described is generally satisfactory but has one recognized limitation. This is that the apparatus does not seal the tube against gas pressure. Hence, it is necessary, when using such apparatus, to seal the tube after it has been cooled and before expanding it by internal gas pressure. Customarily, then, the tube as it leaves the cooling apparatus is flattened by passage between a pair of squeeze rolls, inflated into a bubble, and flattened again by passage between a second pair of squeeze rolls.

The necessity of having to flatten the tube as it leaves the cooling apparatus in turn imposes a thickness limitation of the film at this point because too thick a film will crack at the fold lines. This limitation, of course, does not apply when the tube is flattened between the second set of squeeze rolls because by then its thickness has been reduced by expansion.

It is an object of the present invention to provide apparatus for extruding and cooling a tubular film which avoids the need for flattening the tube before subsequently expanding it.

In accordance with the invention there is provided apparatus comprising an extruder adapted to extrude molten organic thermoplastic polymer in the form of a tube downwardly through an annular orifice; a substantially cylindrical mandrel affixed to said extruder coaxial with and substantially the same diameter as said annular orifice; means for continuously delivering a cooling liquid circumferentially around the upper extremity of said mandrel; and means for drawing the film downwardly over said mandrel whereby the film contacts the cooling liquid and is thereby cooled and solidified.

Figure 3:
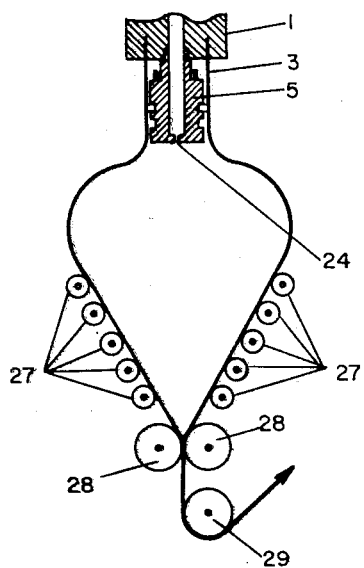
Figure 2:
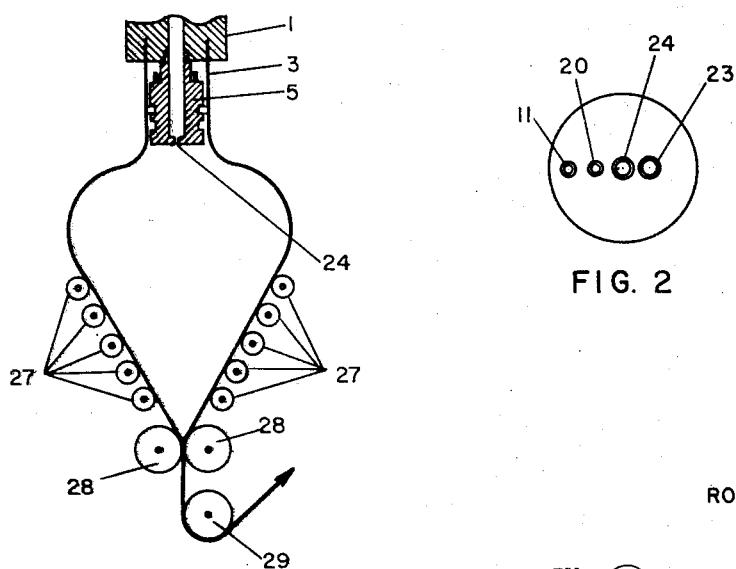

The invention will be described more specifically in connection with the attached drawing consisting of 3 figures. FIG. 1 of the drawing is a mid-sectional view of the extruder and mandrel, showing the extruder schematically (since any conventional extruder can be used in the invention) and the mandrel in detail. FIG. 2 is a sectional view along line A—A of FIG. 1 illustrating the arrangement of various pipes located in the hollow core of the extruder and mandrel. FIG. 3 is a mid-sectional view of the same apparatus (omitting, for the sake of clarity, details of the mandrel shown in FIG. 1) illustrating its use in a film making process.

Referring particularly to FIGS. 1 and 2, the numeral 1 designates an extruder which has a bore 2 and is adapted to extrude a film 3 of molten polymer through an annular orifice 4. Affixed to the extruder via screws 30 extending through insulation 31 is a cylindrical mandrel 5 having a bore 6 coaxial with the bore of the extruder 1. The upper periphery of the mandrel 5 is cut away to form a peripheral recess 7 bounded by vertical surface 8 and horizontal surface 9. Extending vertically into the recess 7 to a fraction of its height is a circular projection 10. The numeral 11 denotes a pipe which serves as a means for carrying cooling liquid to an annular internal canal 12 which in turn communicates through vertical passageway 13 with the peripheral recess 7 at a point nearer the periphery of the mandrel 5 than circular projection 10. A second annular internal canal 14 is provided in the mandrel to receive liquid overflowing the projection 10. A vertical passageway 15 connects the annular canal 14 with a third annular internal canal 16. The third annular canal 16 in turn communicates through a passageway 17 with a second peripheral recess 18 in the surface of the mandrel. Within the second peripheral recess 18 is placed a sponge 19. The third annular internal canal 16 also communicates with pipe 20 that is connected to a source of vacuum (not shown). Further down the mandrel is a third peripheral recess 21 which connects through passageway 22 with pipe 23 which also is connected to a source of vacuum (not shown). Extending downwardly through the bores of the extruder and mandrel is another pipe 24 which extends slightly beyond the mandrel and is externally sealed by the base 25 of the mandrel, the upper end of pipe 24 being connected to a source of compressed gas (not shown). Referring back to the top of the mandrel, there is shown port 26 which connects the peripheral recess 7 with the bore of the mandrel and which serves to equalize pressure in the recess 7 by providing communication to the atmosphere or other source of pressure as desired.

Referring specifically to FIG. 3 there is shown extruder 1, film 3 and mandrel 5 as in FIG. 1. Additionally, there is shown converging rollers 27, squeeze rolls 28 and guide roll 29, the function of which will subsequently be described.

In operation, the apparatus of the invention functions as follows: a tubular film 3 of thermoplastic, organic polymer is extruded downwardly through the annular orifice 4 of the extruder 1 to envelop the mandrel 5. Simultaneously, cooling liquid, e.g., water, is conveyed by pipe 11 into canal 12 of the mandrel from whence the liquid flows through passage 13 into recess 7. As the liquid level in the recess 7 increases, the liquid overflows projection 10 into canal 14 from where it is removed from the apparatus by aspiration through passage 15, canal 16 and pipe 20, while entry of air into recess 7 through port 26 serves to maintain atmospheric pressure within the recess. Meanwhile the film 3 as it is drawn over the mandrel contacts the reservoir of liquid in recess 7.

As the film 3 progresses further in its downward travel, any liquid carried with it between the inner surface of the film and the outer surface of the mandrel is absorbed by sponge 19 and as the sponge approaches saturation the liquid is sucked into canal 16 and out of the apparatus through pipe 20. As the film continues its travel, it is drawn tightly against the mandrel 5 by vacuum applied via pipe 23 to recess 21, the purpose of this being to create a seal between the film and lower portion of the mandrel to prevent leakage of gas when the film is inflated. As the film leaves the mandrel it is inflated by the pressure of gas delivered through pipe 24. The bubble formed by inflation is collapsed into flattened form by converging rollers 27 and then sealed by the pressure applied by squeeze rolls 28, the latter rolls also serving to provide the force required to draw the film downwardly over the mandrel. Finally, the flattened film passes over guide roll 29 and thence to splitting and winding means (not shown).

It is to be understood that various other elements may be employed in conjunction with the apparatus of the invention. One such element, for example, comprises means for heating the film just prior to inflation in order to obtain a temperature optimum for orientation. There may also be provided an additional inflating zone where the film can be heat treated to stabilize it against dimensional changes. Still further, means for cooling the film externally can be employed to supplement the internal cooling effected by the apparatus. Additionally, means can be provided for sensing pressure within the inflated tube. These and other modifications are well within the skill of the art.

The apparatus of the invention is particularly useful in making film from crystallizable, organic, thermoplastic polymers that require or are benefited by quenching prior to inflation. Typical of such polymers are stereoregular polypropylene and poly(ethylene terephthalate).

Exemplary of the use of the apparatus, molten poly(ethylene terephthalate) at a temperature of 275° C. is extruded as a tubular film through an annular die of 6 inches outside diameter and 5.94 inches inside diameter and is quenched by contact with cold water circulating through a recess in the upper periphery of a mandrel 6.25 inches in diameter. The flow of water through the recess is adjusted to cool the film to a temperature of 40° C. at an extruder output of 440 pounds per hour at a haul-off speed of about 70 feet per minute. As the film leaves the mandrel it is inflated by air pressure to a diameter of 20 inches, the film being heated just prior to inflation by a circular array of infrared heaters surrounding the tube. The tube is subsequently flattened, split longitudinally and wound.

A primary advantage of the apparatus of the invention is, of course, the elimination of the necessity for using squeeze rolls to seal the tubular film after it has been cooled. This leads to several secondary advantages including the ability to handle thicker film and the avoidance of surface scratches, etc. that are often placed on the film by these squeeze rolls. Another primary advantage is that the apparatus makes it convenient and simple to cool the film both internally and externally by the simple addition of an external water spray or equivalent cooling means.

What I claim and desire to protect by Letters Patent is:

1. Apparatus comprising an extruder adapted to extrude molten thermoplastic ploymer in the form of a tubular film downwardly through an annular orifice; a substantially cylindrical mandrel affixed to said extruder coaxial with and approximately the same diameter as said annular orifice, said mandrel having a recess extending circumferentially around its upper extremity; means for continuously delivering a cooling liquid to said recess; overflow means for maintaining a reservoir of cooling liquid in said recess; means for carrying away cooling liquid overflowing said recess; means for drawing the film downwardly from said mandrel whereby the film contacts the cooling liquid and is thereby cooled and solidified; a second recess extending circumferentially around the periphery of the mandrel at a point below the first named recess; means for applying vacuum to said second recess for removing cooling liquid from between the film and the mandrel; a third recess extending circumferentially around the periphery of said mandrel at a point beneath the second recess; and means for applying vacuum to said third recess to create a gas-tight seal between the film and the mandrel.

2. Apparatus comprising an extruder adapted to extrude molten thermoplastic polymer in the form of a tubular film downwardly through an annular orifice; a substantially cylindrical mandrel affixed to said extruder coaxial with and approximately the same diameter as said annular orifice, said mandrel having a recess extending circumferentially around its upper extremity; means for continuously delivering a cooling liquid to said recess; means for drawing the film downwardly over said mandrel whereby the film contacts the cooling liquid and is thereby cooled and solidified; a second recess extending circumferentially around the periphery of the mandrel at a point beneath the first-named recess; separate means for applying vacuum to said second recess for removing cooling liquid by aspiration from between the film and mandrel; a third recess extending circumferentially around the periphery of said mandrel at a point beneath the second recess; and means for applying vacuum to said third recess to create a gas-tight seal between the film and the mandrel.

3. Apparatus according to claim 2 having means for delivering a gas under pressure to the interior of the tubular film as it leaves the mandrel.

References Cited in the file of this patent

UNITED STATES PATENTS

| 2,433,937 | Tornberg | Jan. 6, 1948 |
| 2,461,630 | Cozzo | Feb. 15, 1949 |
| 2,863,172 | Buteux et al. | Dec. 9, 1958 |
| 2,963,742 | Ahlich et al. | Dec. 13, 1960 |
| 2,987,765 | Cicheli | June 13, 1961 |
| 2,987,767 | Berry | June 13, 1961 |

FOREIGN PATENTS

| 780,900 | Great Britain | Aug. 7, 1957 |
| 822,704 | Great Britain | Oct. 28, 1959 |
| 853,745 | Great Britain | Nov. 9, 1960 |
| 1,211,176 | France | Oct. 5, 1959 |
| 1,237,734 | France | June 27, 1960 |